United States Patent [19]
Oswald et al.

[11] Patent Number: 5,691,637
[45] Date of Patent: Nov. 25, 1997

[54] MAGNETIC FIELD POSITION TRANSDUCER FOR TWO OR MORE DIMENSIONS

[75] Inventors: Richard K. Oswald, San Jose; Ronald A. Smith, Los Gatos, both of Calif.

[73] Assignee: True Position Magnetics, Inc., Campbell, Calif.

[21] Appl. No.: 193,167

[22] PCT Filed: Aug. 28, 1992

[86] PCT No.: PCT/US92/07435

§ 371 Date: Jun. 20, 1994

§ 102(e) Date: Jun. 20, 1994

[87] PCT Pub. No.: WO94/05964

PCT Pub. Date: Mar. 17, 1994

[51] Int. Cl.[6] .................. G01B 7/14; G01B 7/30; G01R 33/12; G01D 5/20
[52] U.S. Cl. .................. 324/207.23; 324/207.2; 338/32 H
[58] Field of Search .................. 324/207.21, 207.2, 324/207.22, 207.23; 338/32 H, 32 R; 345/160, 161

[56] References Cited

U.S. PATENT DOCUMENTS

| | | | |
|---|---|---|---|
| 3,331,971 | 7/1967 | Moller | 338/32 H |
| 4,639,667 | 1/1987 | Andresen | 324/207.23 |
| 4,661,773 | 4/1987 | Kawakita et al. | 324/207.23 |
| 5,504,502 | 4/1996 | Arita et al. | 345/160 |

FOREIGN PATENT DOCUMENTS 929995  5/1982  U.S.S.R. .................. 324/207.12

*Primary Examiner*—Walter E. Snow
*Attorney, Agent, or Firm*—David E. Newhouse, Esq.

[57] ABSTRACT

A transducer for indicating position in space with reference to a coordinate system includes a magnetic field source (13), a movable button element (11) composed of a magnetically susceptible material having a central pole face (16) and a surrounding annular co-planer pole face (19) for providing uniform magnetic flux paths in the annular region between and extending from the plane of the respective pole faces, and a probe element having a plurality of sensor units (41a–d) for electronically measuring magnetic flux through a plurality of separate, geometrically congruent areas arranged around an axis of symmetry (24) in a sensing plane which is spaced from, and parallel to that of the pole faces of the movable button element. The relative position of the button element in a plane perpendicular to the axis of symmetry is determined by electronically adding and subtracting the different measurements of magnetic flux through the respective areas, while the relative proximity of the sensing plane of the probe element to the pole face plane of the button element is determined from total magnetic flux measured by all of the sensors.

20 Claims, 14 Drawing Sheets

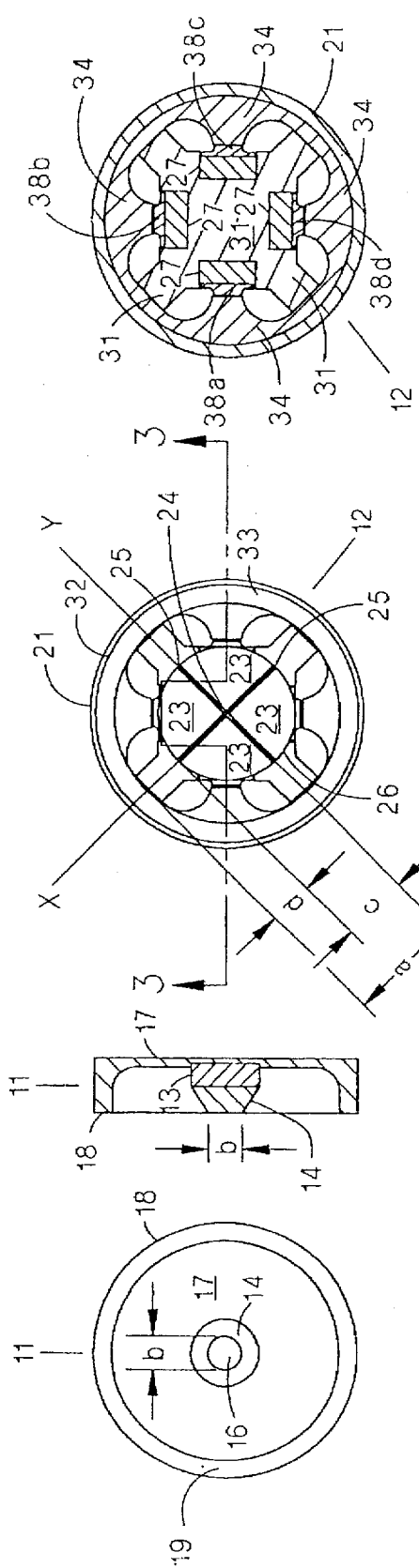
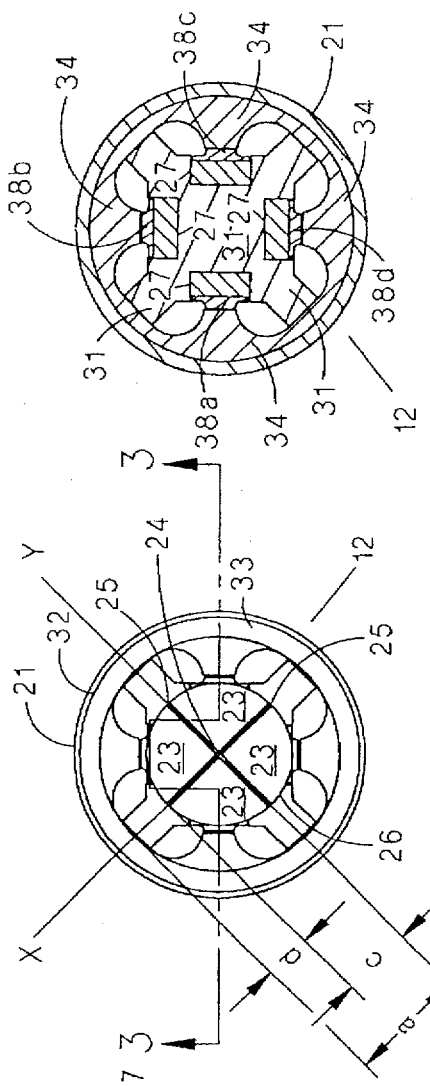
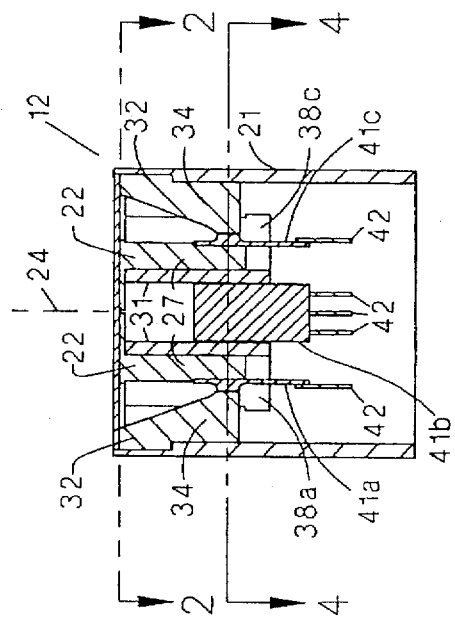

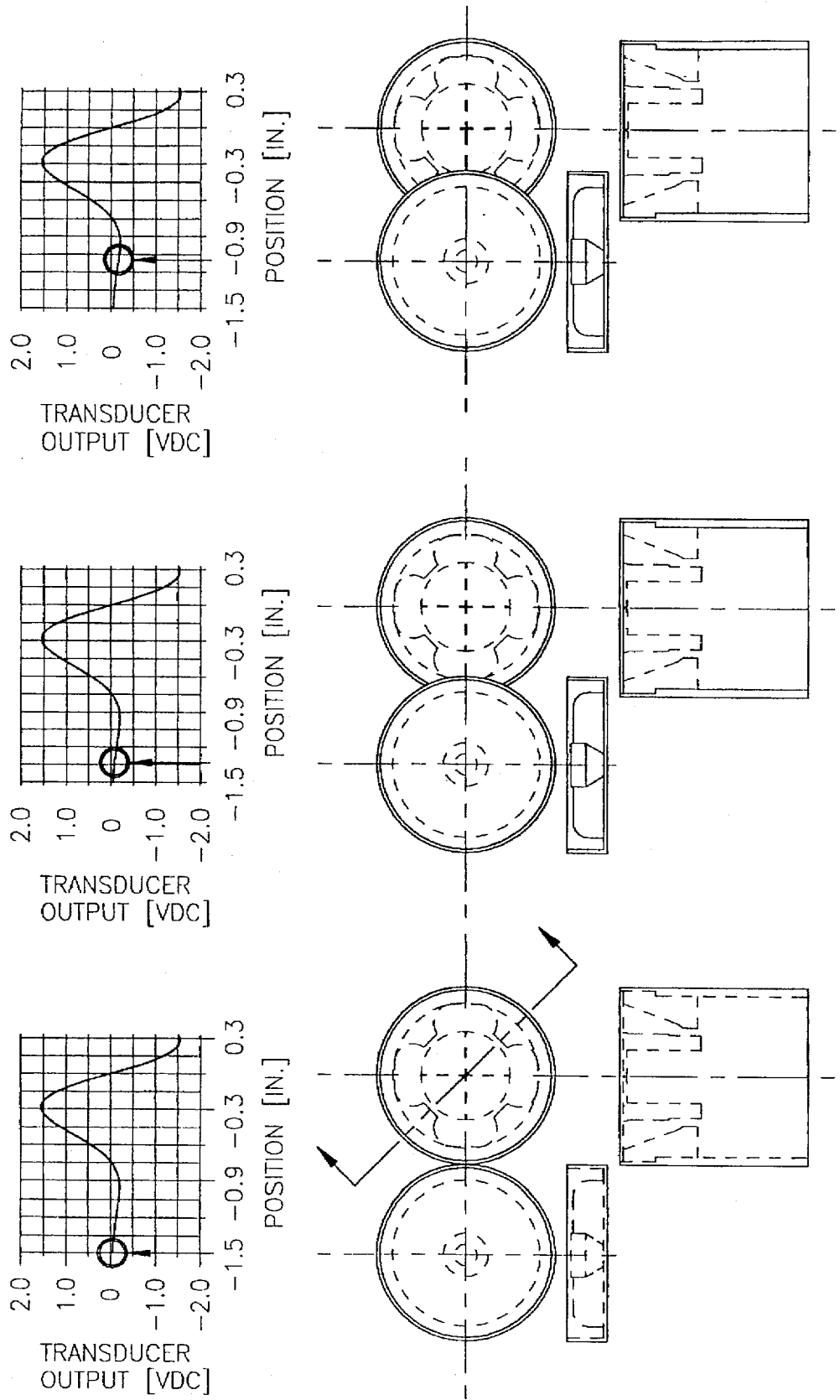

MAGNETIC FIELD POSITION TRANSDUCER FOR TWO OR MORE DIMENSIONS

FIELD OF THE INVENTION

This invention relates to a magnetic flux transducer for indicating position in space with reference to a three dimensional coordinate system, and in particular to a transducer which electronically measures and compares magnetic flux from a movable element through a plurality of geometrically congruent areas arranged around an axis of symmetry in a sensing plane to determine both the relative position of the movable element in a plane perpendicular to the axis of symmetry and the distance of that plane from the sensing plane.

DESCRIPTION OF THE PRIOR ART

Electronic measurement of magnetic flux emanating from a permanently magnetized element with Hall effect and magneto-resistive sensors for the purpose of position indication along a single axis is well known.

For example, U.S. Pat. No. 4,107,604, Bernier (1978) describes a position transducer with a stationary Hall effect sensor located proximate the side of a sliding longitudinal permanent magnet. The reference teaches that the Hall effect sensor will generate a zero or null signal when the sensor is located centrally between the respective pole faces of the magnet, and will generate a signal upon axial translation of the magnet, either positive or a negative depending on direction. The magnitude of the positive or negative signal is related to the magnitude of the translation of the magnet from the central or null position.

U.S. Pat. No. 4,359,677, Dennon (1982), describes a linear indexer controlling a proportional valve to a hydraulic cylinder for positioning a "setworks" system in a lumber mill in which a Hall effect sensor generates a null signal as the sensor translates past a "position indicating" thin magnet having a magnetic axis aligned parallel to the direction of sensor translation. Dennon specifically points out that the Hall effect sensor produces a electrical voltage signal proportional to the incident magnetic flux and that the polarity of the voltage signal reverses when the magnetic field direction reverses.

U.S. Pat. No. 4,691,185, Loubier et al, (1987) describes a "change of state" magnetic switch in which a stationary Hall effect sensor generates an voltage signal which reverses polarity responsive a reverse in polarity of a magnetic field along the central axis of a permanent annular magnet translating along its axis toward and away from the Hall sensor. Loubier et al specifically teaches that an annular geometry of the permanent magnet provides high gradient field reversals at specific distances from the annular pole face of the magnet. The graph presented in FIG. 4 of Loubier et al illustrates an almost linear region of high gradient or rate of change of field strength along the central axis of a annular magnet within a certain range from the annular face of the magnet and a field reversal at a particular distance from the face.

U.S. Pat. No. 3,419,798, Walton, (1968) describes a displacement transducer in which outputs from a pair Hall effect sensors sensing magnetic flux from a curved permanent magnetic strip are algebraically summed to produce an output signal related to the relative positions of the sensors and the strip along a given axis.

U.S. Pat. No. 3195,043, Burig (1965) describes a proximity transducer in which a tapered pole piece composed of a magnetically susceptible material mounted on one end of a permanent magnet concentrates magnetic flux through a Hall effect device mounted on the small end pole piece when a magnetically susceptible material is moved into proximity of the pole piece.

U.S. Pat. No. 4,908,527, Van Antwerp (1990) describes a Hall effect integrated circuit transducer chip which changes switching states responsive to the changes in magnetic field intensity prompted by relative movement a permanent magnet between two different positions. Van Antwerp discuses the necessity to provide such a system with temperature compensating features to off set effects of temperature on magnetic field intensity emanating from a permanent magnetized element of the system.

However, neither Hall type nor magneto-resistive transducing systems have been adapted to provide position indication relative to two more orthogonal axes simultaneously. Such systems, would have significant advantages because both mechanical and electrical connections between the relatively moving elements are eliminated. Such multiple dimension or absolute position data is essential in robotics, particularly when a controlling computer loses or screws up encoding data from which the position of an articulating element is determined mid-process.

SUMMARY OF THE INVENTION

The invented transducer for indicating position in space with reference to a three dimensional coordinate system includes a magnetic field source, a movable button element composed of a magnetically susceptible material having a central pole face and a surrounding annular co-planer pole face for providing uniform magnetic flux paths in the annular region extending from the plane of and between its respective pole faces, and a probe element having a plurality of sensor units for electronically measuring magnetic flux through a plurality of separate, geometrically congruent areas arranged around an axis of symmetry in a sensing plane which is spaced apart from, and parallel to that of the pole faces of the magnetized button element. Electrical signals from the respective sensors indicative of the different measurements of magnetic flux through the respective congruent areas are electronically added and subtracted to give relative position data of the button element in a plane perpendicular to the axis of symmetry of the probe element while the total magnetic flux measured by all of the sensors gives the relative proximity of the plane of the pole faces of the button element to the sensing plane of the probe element.

The probe element includes a plurality of central members and an annular member both composed of a magnetically susceptible material for providing preferred magnetic flux paths. Each central member presents a central face section proximate the axis of symmetry and has a magnetic flux concentrating section providing a preferred magnetic flux path from the central face to a sensor gap surface. When positioned around the axis of symmetry, the face sections of the central members of the probe define a regular (circular) central sensing surface with narrow slits radially extending from the axis of symmetry between the respective faces. The annular member presents an annular sensing surface co-planer with and coaxially surrounding the central sensing surface, and includes a plurality of magnetic flux concentrating sections each providing a preferred magnetic flux path from a segment of the annular sensing surface to a sensor gap surface proximate a sensor gap surface presented by one of the central members. A magnetic flux sensor is located in each narrow gap defined between the respective sensor gap surfaces of the central members and those of the annular member for generating electrical signals proportional to the magnetic field intensity across the gap.

Alternatively, the annular member may be formed from a plurality of separate annular segments each having a magnetic flux concentrating section providing a preferred magnetic flux path from its annular segment of the sensing surface to a sensor gap surface proximate a sensor gap surface presented by one of the central members. The annular sensing surface has slits separating the respective annular segments which register with the slits between the face sections of the central sensing surface.

The respective diameters of the central sensing surface of the probe element and the central pole face presented by the button element may be chosen to provide a desired range and sensitivity (accuracy) in off-axis measurement data. Ideally, the annular sensing surface of the probe element and the annular pole face of the button element should have the same mean diameters.

DESCRIPTION OF THE FIGURES

FIGS. 1a & 1b present orthogonal views of the movable button element of the invented magnetic field position transducer.

FIG. 2 presents a top view of the probe element of the invented magnetic field position transducer.

FIG. 3 presents a side elevation section of the probe element of the invented magnetic field position transducer shown in FIG. 2 take along line 3—3.

FIG. 4 presents a vertical plan view of the probe element of the invented magnetic field position transducer taken along line 4—4 of FIG. 3.

FIGS. 10a–10f each illustrate relative positions of the movable button element and the probe element of the invented magnetic field position transducer relative to a plot of the characteristic electrical signal output as the movable button element moves along a reference axis from tangential to coaxial registry with the probe element.

DETAIL DESCRIPTION OF EXEMPLARY AND PREFERRED EMBODIMENTS

Figure 5A:
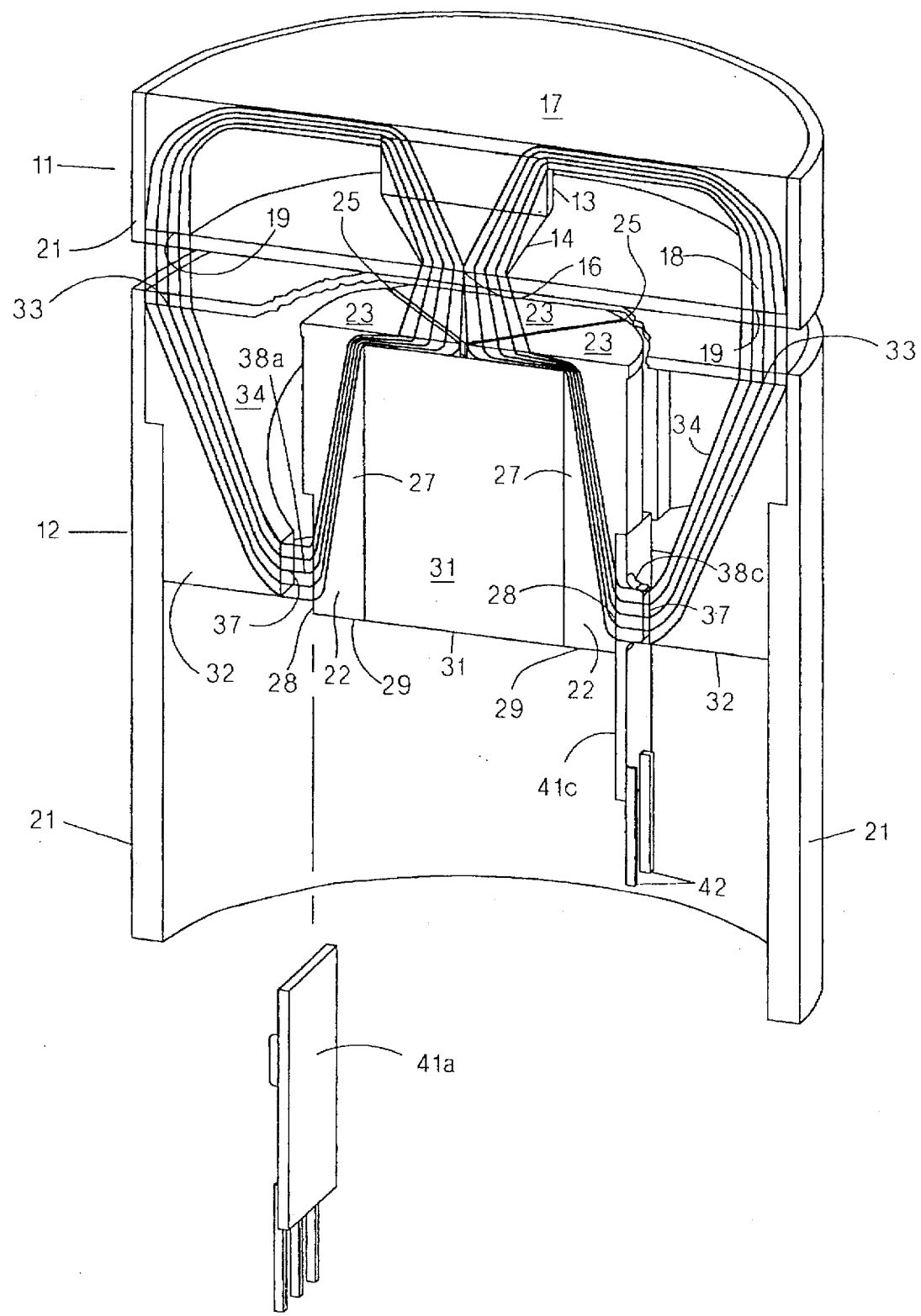
FIGS. 5a & 5b are cut away perspective renderings of the probe and button elements of the invented magnetic field position transducer, FIG. 5a schematically indicating the distribution of magnetic flux lines between the respective components of the invented magnetic field position transducer, FIG. 5b showing the magnetically and nonmagnetically susceptible components of the invented magnetic field position transducer.
Figure 5B:
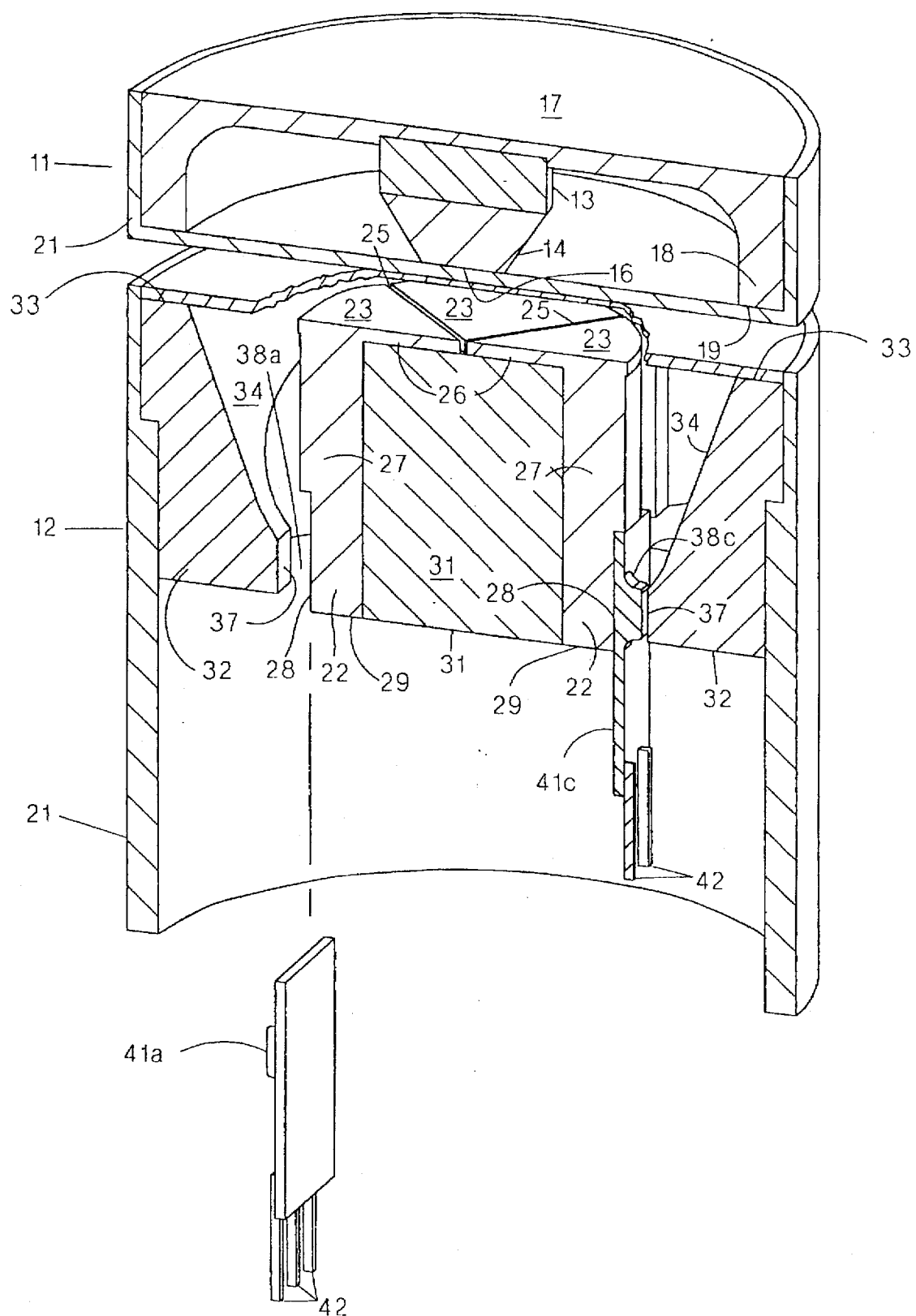

Referring to FIGS. 1–5 the sensing components of the invented magnetic field position transducer include a movable button element 11 (FIGS. 1a, 1b & 5) and a stationary probe element 12 (FIGS. 2–5).

The movable button element 11 includes a permanent magnetic rod 13 providing a magnetic field. A conically tapering magnetic flux concentrator 14 composed of a magnetically susceptible material is secured at its base to a pole face of the same diameter of the rod magnetic 13 establishing the effective diameter of the central pole face 16 of the movable button 11. A circular plate 17 with a depending integral annular rim 18 also composed of a magnetically susceptible material is secured coaxially to the remaining pole face of the red magnet 13 to provide an annular pole face 19 for the movable button 11 which is of opposite polarity and co-planer with the central pole face 16. The respective depending poles 16 & 19 of the movable button are received in a surrounding cladding cap 21 (FIGS. 5a & 5b) composed of a magnetically transparent material. The cladding cap 21 prevents material from collecting in the annular volume between the pole faces 16 & 19 and the circular plate 17. Such materials could affect the the uniformity of the magnetic flux paths in the annular region extending from the plane of and between the respective pole faces 16 and 19 of the movable button 11. In selecting the materials for the permanent rod magnet 13, flux concentrator 14, and circular plate 17 with annular rim 18 care should be taken the the respective magnetic and magnetically susceptible components have uniform permeability. The nonmagnetic or magnetically transparent cladding cap 21 also should be composed of a material such as aluminum which does not distort the uniformity of the flux paths between the pole faces.

Turning now to FIGS. 2–5, the probe element includes four central members or quadratures 22 and an annular member 32. Each quadrature 22 presents a relatively thin quarter-circle face plate 23 composed of a magnetically susceptible material. The quadratures are symmetrically positioned around an axis of symmetry 24 to define a circular sensing surface 26 with two perpendicularly intersecting slits 25 extending radially from the axis of symmetry 24. A magnetic flux concentrator 27 composed of a magnetically susceptible material depends from the face plate 23 to provide a preferred magnetic flux path to a quadrature sensor gap surface 28 at its distal end 29. The slits 25 should be of sufficient width to assure that the preferred path of magnetic flux intercepted by each quarter circle face plate 23 is through the magnetic flux concentrator 27 depending from that particular plate and not a magnetic flux concentrator 27 depending from another plate. In general, a slit width equal to ½ the edge thickness of the quarter circle face plate 23 has been found suitable. To further assure isolation of the respective magnetic flux paths of each quadrature, the magnetic flux concentrators 27 should be located near the circular periphery of the face plate 23. Gradually increasing the thickness of a face plate 23 radially and from its periphery to form an integral stem that becomes the depending magnetic flux concentrator 27 should further improve the magnetic flux conduction path from the intercepting quarter-circle planer faces 23 to the sensor gap surface 28 at the distal ends 29 of the quadratures.

The annular member 32, composed of a magnetically susceptible material, presents an annular sensing surface 33 co-planer with and coaxially surrounding the central circular sensing surface 26. The annular member 32 has four symmetrical magnetic flux concentrating sections 34 tapering helically downward (FIGS. 4 & 5) from quarter circle segment sections 36 of the annular sensing surface 33 to a sensor gap surface 37 proximate a quadrature sensor gap surface 28. Four sensor gaps 38a, 38b, 38c, & 38d are defined between the sensor gap surfaces 28 presented by the quadratures 22 and those sensor gap surfaces 37 presented by the annular member 32.

As illustrated the annular sensing surface 33 is spaced radially outward from a quarter-circle face plate 23 of a quadrature 22 a sufficient distance (d) such that each symmetrical magnetic flux concentrating section 34 of the annular member 32 provides a preferred magnetic flux return path for closing magnetic field line loops 39 (FIGS. 5a & 5b) of magnetic flux intercepted by the quarter circle face plate 23 and quadrature 22 through an annular segment of the sensing surface 33 in the same quadrant. Alternatively, if the annular member is formed from a plurality of separate annular segments each has a magnetic flux concentrating section providing a preferred magnetic flux path from its annular segment of the annular sensing surface 33 to a sensor gap surface 37 proximate a sensor gap surface 28 presented by one of the quadratures 22. In this case, the annular sensing surface 33 would have slits separating the respective annular segments which would register with the slits between the quarter circle face plates 23 of the quadratures 22.

A mounting piece 31 is composed of a non-magnetic or magnetically transparent material such as aluminum, and holds the four quadrature members 22 in position around the axis of symmetry 24. Arms 43 extending from the body of the quadrature mounting piece 31 holds the annular member 32 in position coaxial with the axis of symmetry 24. Similar to the movable button 11, the sensing surfaces 26 & 33 and annular member 32 of the probe element 12 are encased in an nonmagnetic, magnetically transparent cladding 21 such as aluminum to prevent extraneous debris from collecting in gaps and slits which could distort or disrupt the preferred magnetic field or flux pathways provided by the magnetically susceptible components of the probe 12.

Magnetic flux sensors 41a–d such as a Hall effect device, a magneto-resistive device or a magneto-transistor device are located in each of the sensor gaps 38a–d respectively for generating four different electrical signals proportional to and indicative of the polarity of the magnetic flux between the respective surfaces 28 and 37 in the four different gaps. The sensors 41a–d each include electrical leads 42 from which the generated electrical signal can be adjusted and output into appropriate circuitry for further processing to provide data indicative of: (i) the position of the movable button 11 in a plane perpendicular to the axis of symmetry 24 of the probe element 12 and (ii) the distance between the plane of pole faces 16 & 19 of the movable button 11 and the plane of the sensing faces 26 & 33 of the probe element 12. [See FIG. 5.]

The dimensions of the pole faces 16 & 19 of the movable button 11, the annular sensing sensing surfaces 26 & 33 of the probe 12 and the gap distance (d) between the sensing surfaces 26 & 33 all relate. As shown in FIGS. 1–5a&b, the exterior dimensions, i.e., those of the annular pole face 19 and annular sensing surface 33 are the same. While it may not be necessary for the annular pole face 19 and annular sensing surface 33 have the same radial dimensions, ideally they should at least have the same mean diameters. The interior dimensions of the button 11 and probe 12 are chosen to provide a desired range and sensitivity to the off-axis measurement data provided by the invented magnetic field position transducer. As depicted in FIG. 2, the radial (a) to the annular sensing surface 26 of the probe should be greater than than the radius (c) of the central circular sensing surface 33 which in turn should be greater than the diameter (b) of the central pole face 16. The annular gap distance (d) between the periphery of the central sensing surface 26 and the interior edge of of the annular sensing surface 33 should at least be equal to, if not be slightly greater than the diameter (b) of the central pole face 16.

The principal criteria applied for determining the annular gap distance (d) is the desired range of space that can be allowed between the parallel button pole faces and the probe sensing surfaces over which the magnetic flux sensors will generate recognizable electrical signals. Generally, annular gap distance (d) should be of sufficient magnitude to establish preferential magnetic field paths through the respective magnetic flux concentrating sections 27 and 34 and sensors 41a–f of the probe 12, i.e. the annular gap must present a path of greater reluctance than the flux concentrating sections and sensors when the respective pole faces of the button and sensing faces of the probe are proximate within the desired range. In fact, all gap distances of the invented position transducer, including the width of the narrow slits between the face plates 23 of the sensing surface 26 and the sensor gaps 38 of the probe 12 are selected for minimizing magnetic flux leakage from the preferential magnetic field paths through the components of the transducer when the respective pole faces of the button and the respective sensing surfaces of the probe are parallel and proximate within the desired range.

Such dimensional differences are also necessary to be able to differentiate between different sections of the electrical signal or pulse generated by a particular magnetic flux sensor 41 as the button moves about in a plane perpendicular to the axis of symmetry 24 above the sensing surfaces of the probe 12.

Figure 9:
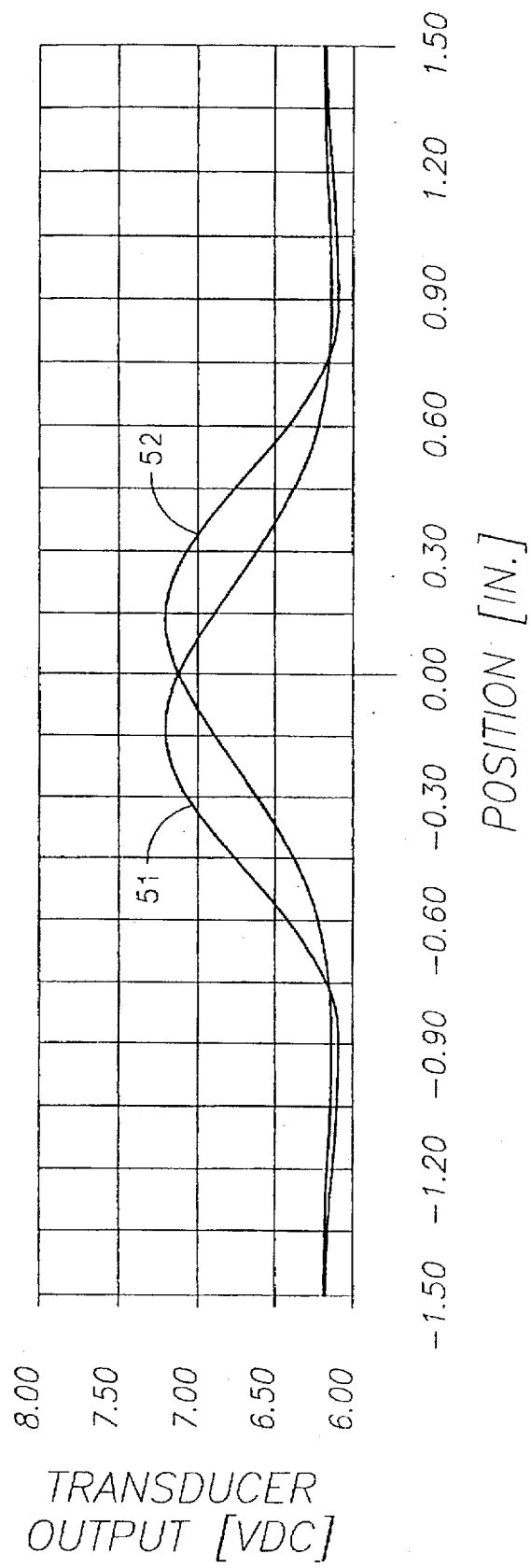
FIG. 9 present a representative graph plotting a characteristic electrical signal train as a function of position expected from a magnetic flux sensor component of the invented magnetic field position transducer.
Figure 10F:
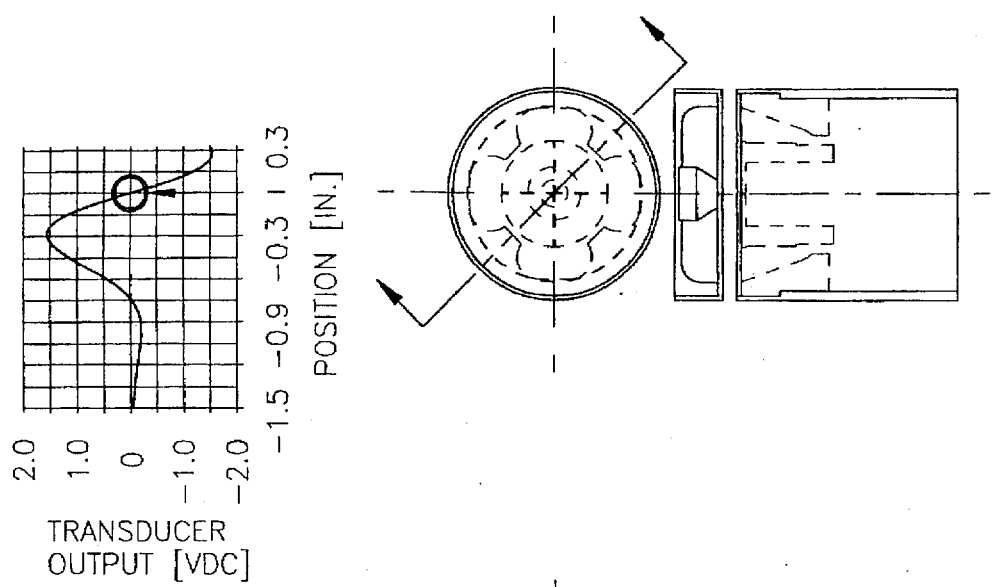
Figure 10E:
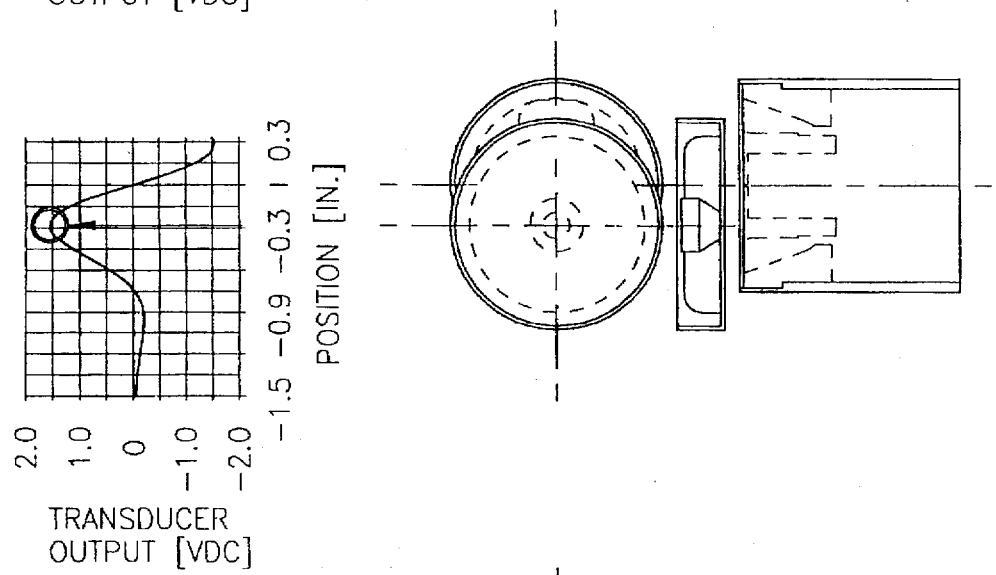
Figure 10D:
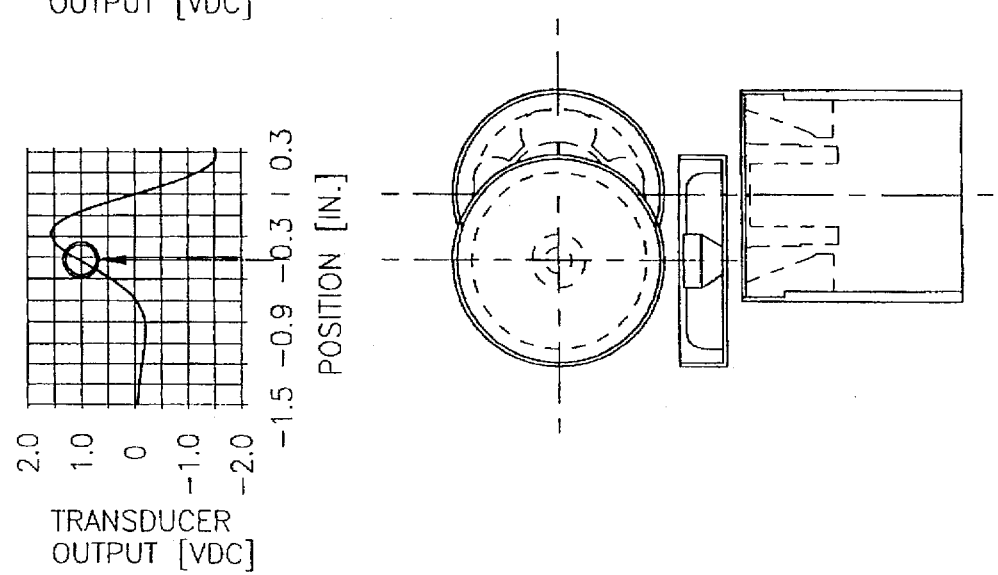

In more detail, in a Cartesian coordinate system, with reference to FIGS. 2, 9, and 10 a–f, the z-axis is selected to coincide with the axis of symmetry 22, the x-axis with one of the perpendicularly intersecting slits and the y-axis with the other of the perpendicularly intersecting slits dividing the quarter circle face plates 23 of the quadratures 22. The plot of FIG. 9 shows two curves 51 & 52 plotting the magnitude (and sign )* of characteristic electrical signal expected from the flux sensors 41a & 41b [curve 51] and 41c & 41d [curve 52] as, for example, the movable button 11 moves from left to fight along the x-axis into, across, and out of registry with the probe 12. Ideally, if the parity curve 51 is switched and scale of the plot is reversed, so that it reads right to left instead of left to right as the button 11 moves left to right along the x-axis across probe 12, one obtains curve 52, a plot of the preferred characteristic signal desired from flux sensors 41c & 41d as the button 11 moves from left to right across the probe 12.

Briefly to explain the sections of the curves plot of FIG. 9, as the leading edge of annular pole face 19 of the movable button 11 moves, into proximity of the annular sensing face 33 of the probe 12, the electrical output of the magnetic flux sensors 41a & 41b [curve 51] on the left side of the probe 12 begins change indicating that magnetic flux across the respective sensor gaps 38a & 38b is changing. As shown in the plots, the initial signal change is arbitrarily selected to decrease because of the polarity of the magnetic field. Such initial signals indicate that the movable button 11 is sufficiently proximate the probe 12 such that its magnetically susceptible components are beginning to affect the magnetic field emanating from the movable button 11. As the leading edge of the annular pole face 19 of the button 11 moves into and across annular space (d) between the annular sensing surface 33 and the circular sensing face 26 of the probe 12, the central pole face 16 of the button 11 approaches the annular sensing surface 33 of the probe 12, and the electrical signals of flux sensors 41a & 41b increase in magnitude and maximize as the central pole face 16 of the button 11 moves into registry with the annular sensing surface 33. Then as the button 11 continues to move along the x-axis the magnitude of (negative) electrical signals flux sensors 41a & 41b slightly decreases as the central pole face 16 moves out of registry with the annular sensing surface into the annular region (d) between the sensing surfaces 33 & 26. As the pole face 16 moves across the annular region (d) between the sensing surfaces 33 & 26 and approaches the central sensing surface 26, the slope of the curve 51 plotting the electrical output of flux sensors 41a & 41b reverses and the output form the sensors begin to increase in magnitude at greater rate. The slope reversal indicates that the magnetic field sensed by sensors 41a & b has at that point changed polarity. As the pole face 16 moves over the circular sensing surface 26 [and the trailing edge of the annular pole face 19 moves closer to registry with the annular sensing surface 33] the magnitude of the electric output from the two particular sensors 41a & 41b continues to smoothly increase and maximize at the point where the central pole face 16 is tangential to the y-axis slit 25. As the leading edge of the pole face 16 begins to move into, across and out of coaxial registry with the axis of symmetry 24, the magnitude of the electrical outputs from the flux sensors 41a & 41b smoothly decrease more or less linearly to plateau region. Finally, as the annular pole face 19 sweeps across the circular sensing surface 26 and the central pole face 16 sweeps across the annular sensing surface on the the right side of the probe 12, the slope of curve 51 plotting electrical output from flux sensors 41a & 41b reverse and magnitude increase slightly indicating a reversal of polarity of the magnetic field across gaps 38a & 38b and weak coupling of the magnetic field from the button 11 through those components of on the left side of the probe 12.

FIGS. 10a–10f illustrate the relative positions of the movable button 11 and the probe 12 with reference to a curve plotting algebraically summed and normalized electrical outputs from all four flux sensors 41a–41d as the movable button moves left to right along the x-axis from a tangential position (FIG. 10a) into coaxial registry with the probe.

Figure 6:
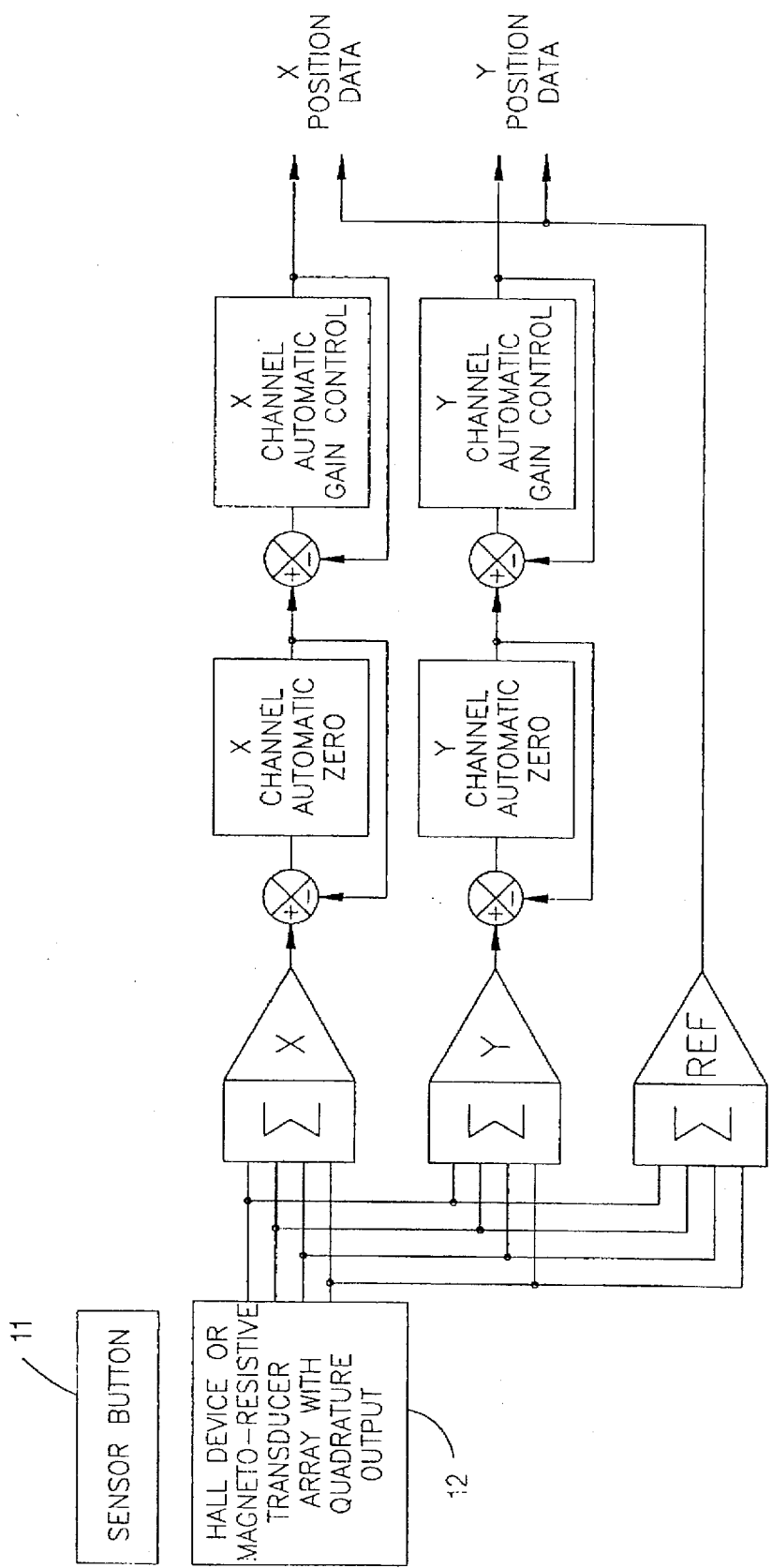
FIG. 6 is a schematic block diagram showing the essential functional electronics components of the invented magnetic field position transducer.
Figure 7A:
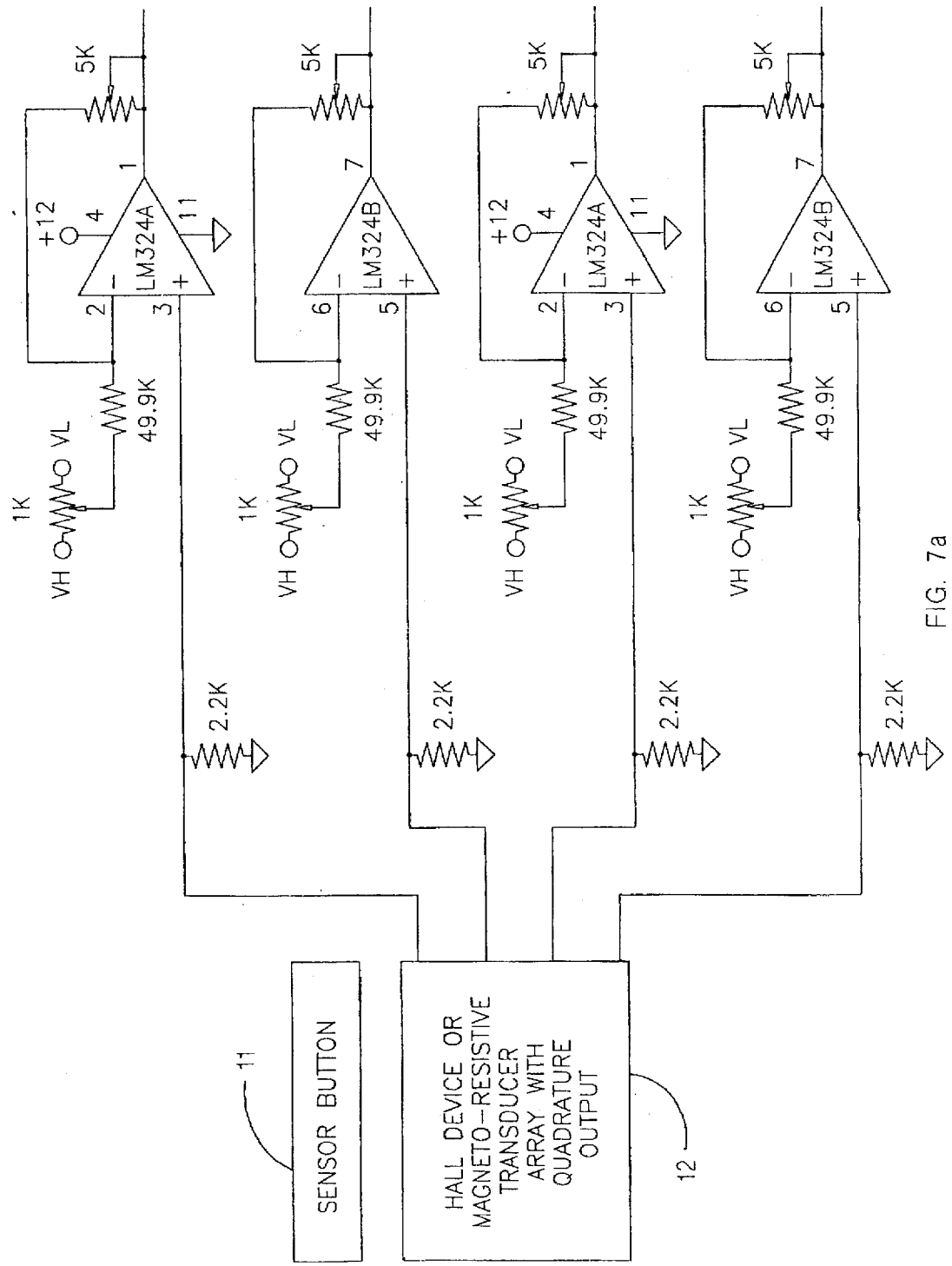
FIG. 7 is a schematic showing the electronic components of suitable summing circuits receiving input from the probe element of the invented magnetic field position transducer and generating output to the remaining electronic components of the system.
Figure 7B:
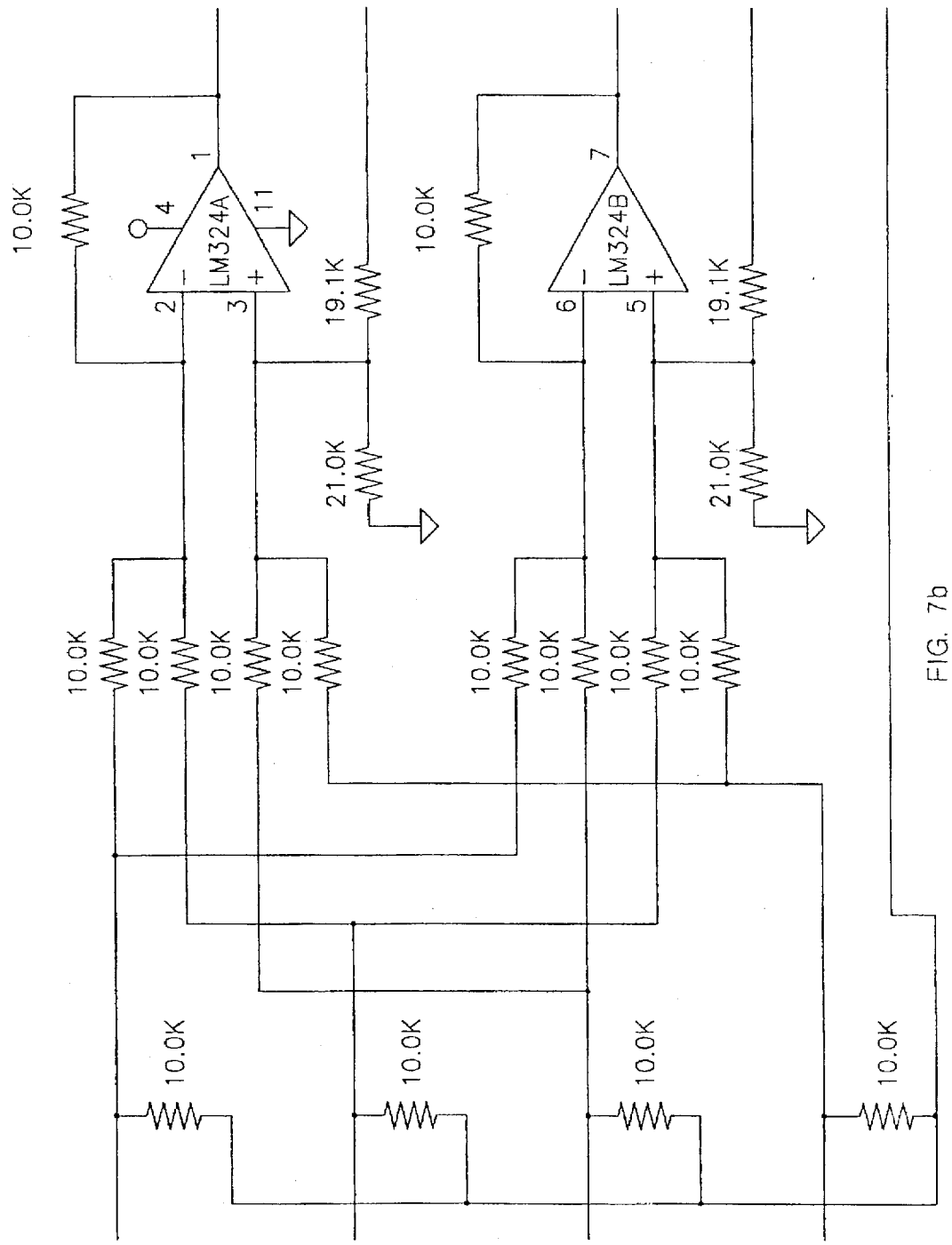
Figure 7C:
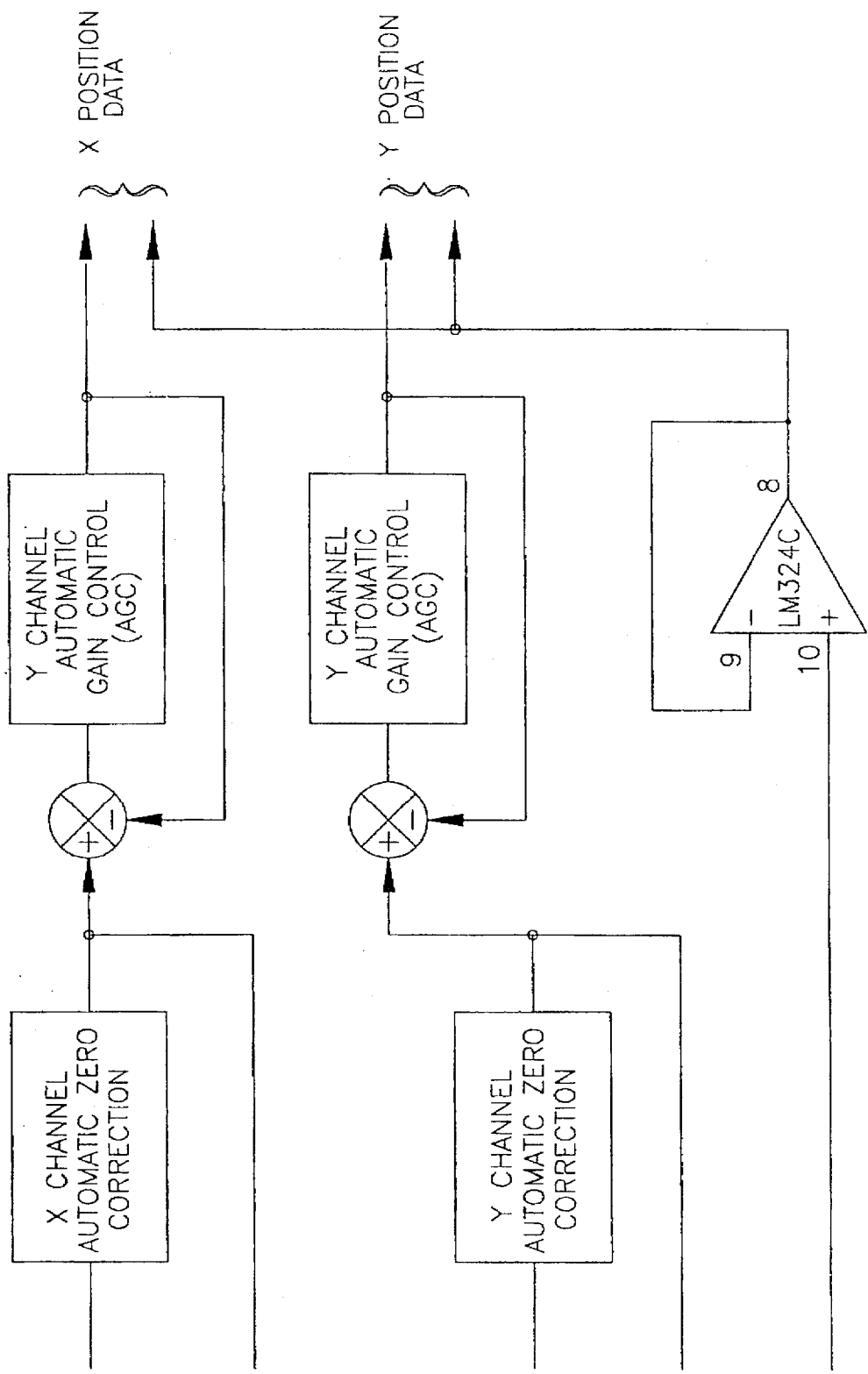
Figure 8A:
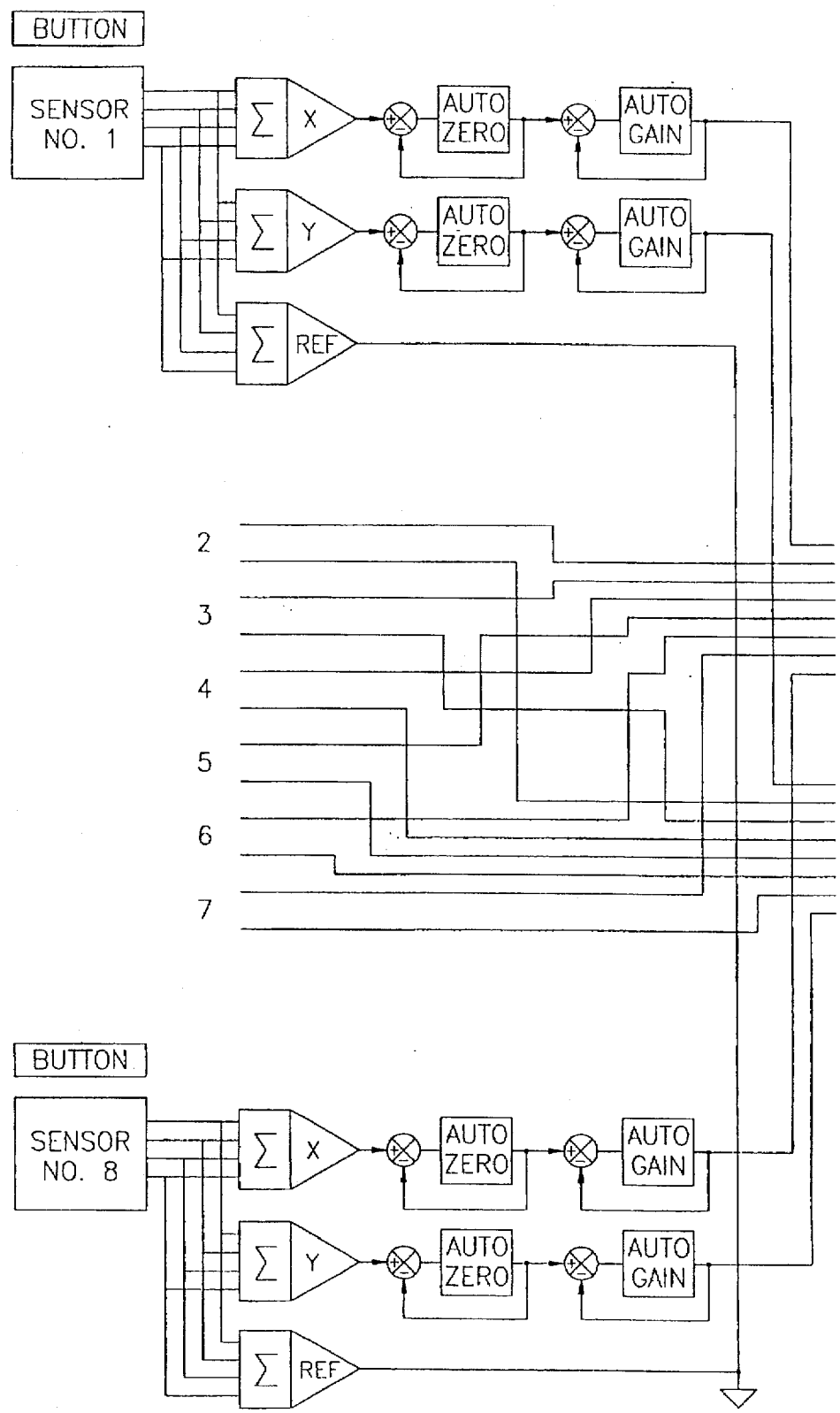
FIG. 8 presents a block diagram schematic illustrating exemplary functional components of an interface system between a plurality of the invented magnetic field position transducers and a general purpose computer suitable generally for robotic and other analogous applications.
Figure 8B:
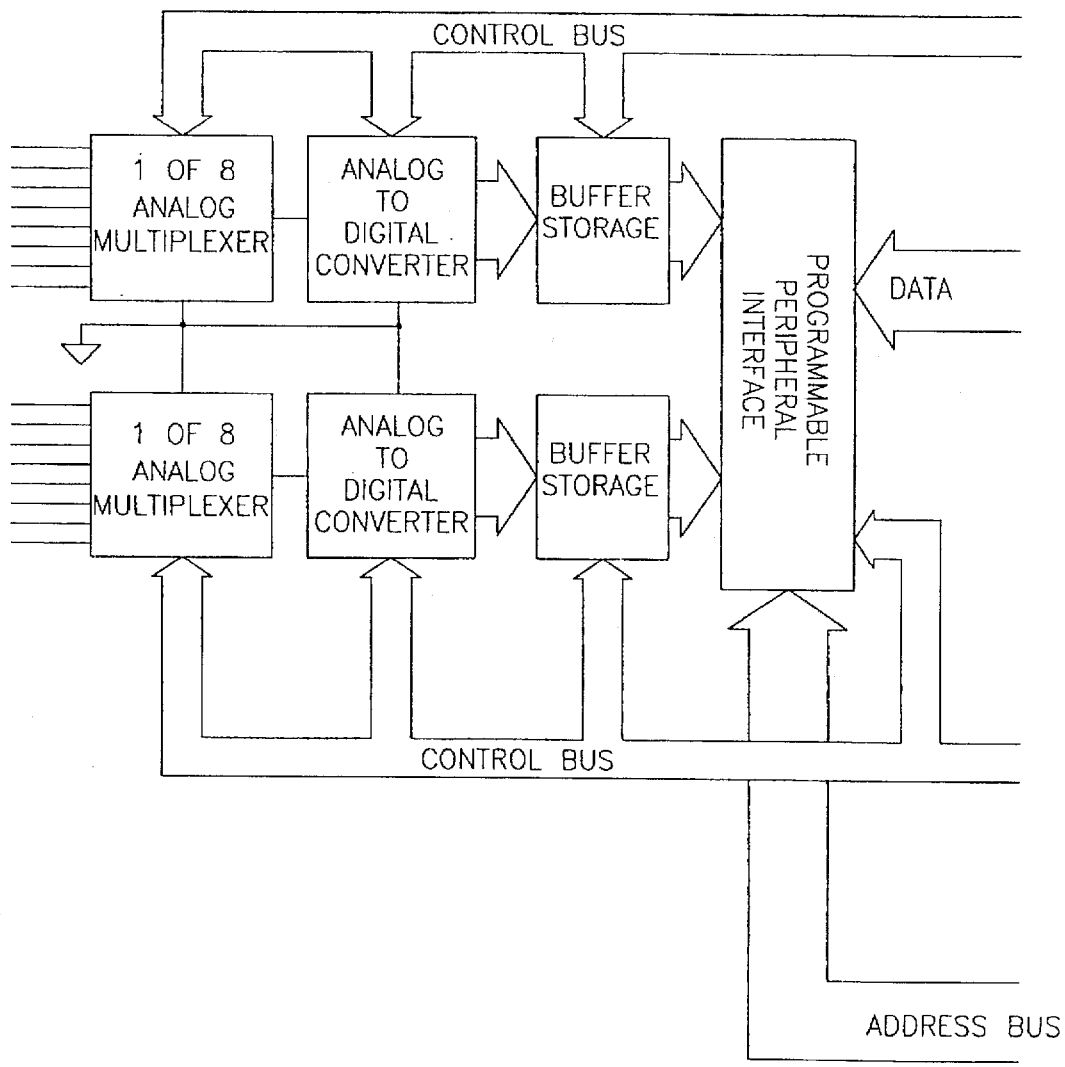
Figure 8C:
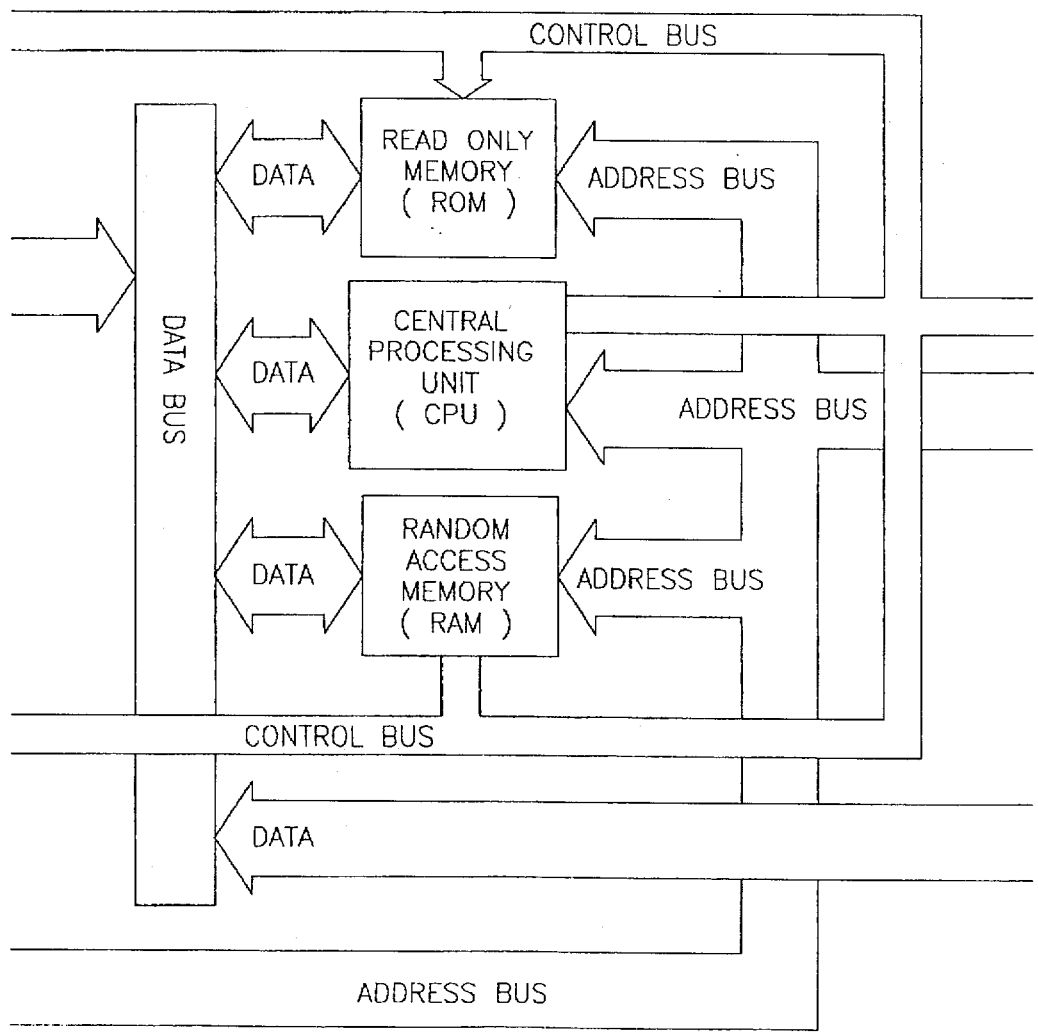
Figure 8D:
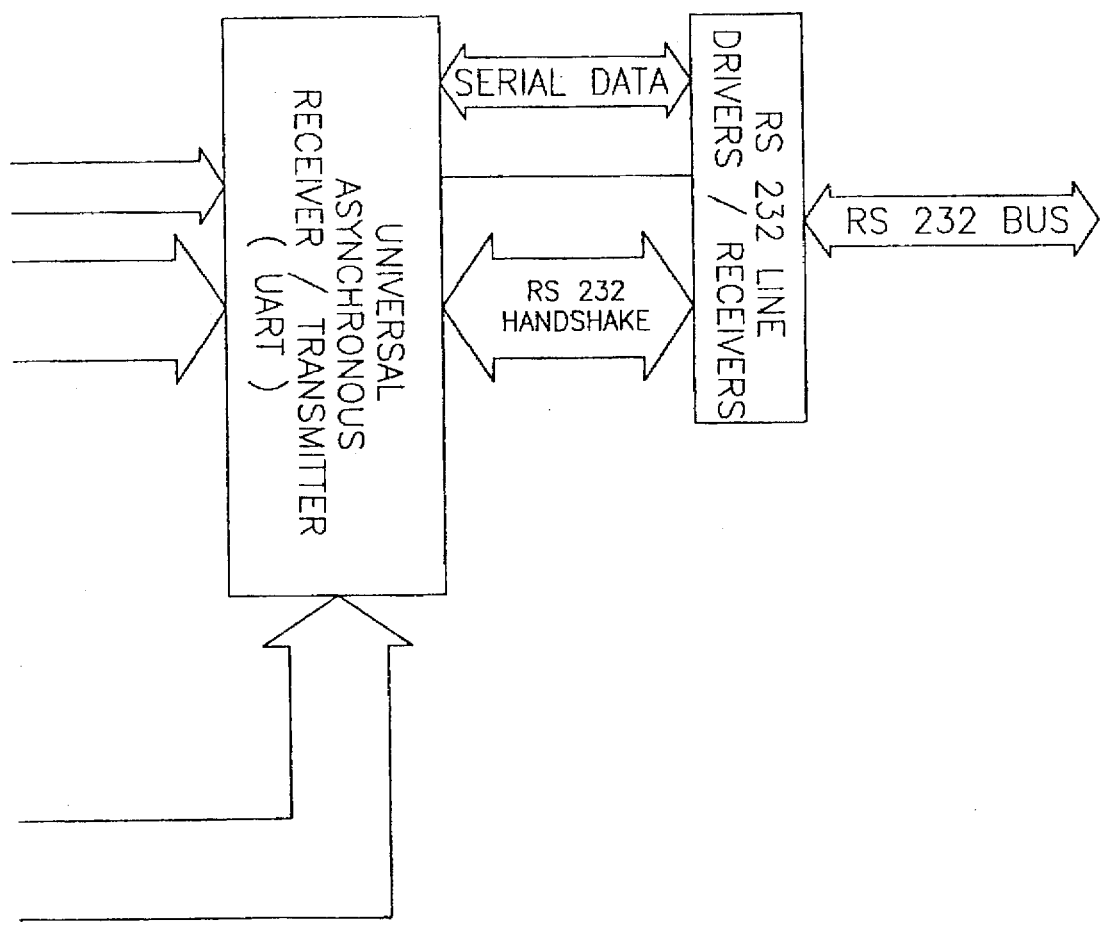

As indicated in FIGS. 6, 7 & 8, the electrical output of the four flux sensors are algebraically summed electronically. In particular, the electrical outputs of the respective sensors 41a, 41b, 41c, & 41d are algebraically summed electronically according to the following relationships:

$$V_x=[(v_a+v_b)-(v_c+v_d)];$$

$$V_y=[(v_a+v_d)-(v_b+v_c)];$$

where:

$V_x$ is a voltage indicative of position along the x-axis, $V_y$ as a voltage indicative of position along the y-axis, $v_a$ as the voltage output of flux sensor 41a, $v_b$ is the voltage output of flux sensor 41b, $v_c$ is the voltage output of flux sensor 41c, and $v_d$ is the voltage output of flux sensor 41d.

With reference to the Cartesian coordinate system referred to previously, flux sensor 41a generates a voltage output indicative of magnetic flux in the quadrant below the x-axis to the left of the y-axis, flux sensor 41b generates a voltage output indicative of magnetic flux in the quadrant above the x-axis to the left of the y-axis, flux sensor 41c generates a voltage output indicative of magnetic flux in the quadrant above the x-axis to the right of the y-axis, flux sensor 41d generates a voltage output indicative of magnetic flux in the quadrant below the x-axis to the right of the y-axis.

With reference to FIGS. 6, the essential functional electronic components of the described magnetic field position transducer includes the movable sensor button 11, the probe 12 with Hall Effect or magneto-resistive (magneto-transistor) magnetic flux sensors providing electrical output to summing operational amplifiers ΣX, ΣY & ΣREF. The output from the respective summing operational amplifiers ΣX & ΣY is adjusted first by a conventional automatic zero correction (AZC) circuit and then by a conventional automatic gain correction (AGC) circuit. The adjusted outputs from the respective summing operational amplifiers ΣX & ΣY and the output from operational amplifier ΣREF is input into an appropriate means for plotting or indicating position. The relative distance between the respective pole face plane of the button 11 and the sensing surfaces of the probe can be ascertained from the output of the operational amplifier ΣREF which provides a voltage output indicative of the total magnetic flux sensed by all four of the flux sensors. For example, such output can be electronically compared to calibration data previously stored electronically via conventional look-up logic circuitry systems to give a distance with reference to the z-axis or the axis of symmetry 24.

The AZC and AGC adjustments are necessary because of variations in the ambient or external magnetic fields where the invented magnetic field position transducer is located. Also, as discussed by Van Antwerp, supra, it may be necessary to off set effects of temperature on the measurement of magnetic flux from the magnetic field source 13. It should be appreciated, however, that the effects of many of such ambient or environmental factors are mitigated inherently by the fact that the outputs from the respective flux sensors 41 a–d are compared, and the fact that the direction of the magnetic fields through the respective sensor gaps 38 on opposite sides of the probe are opposite.

FIG. 7 presents a schematic showing suggested electrical circuitry components for the summing operational amplifiers ΣX, ΣY & ΣREF.

The block diagram of FIG. 8 illustrates how the electrical output from a plurality the invented magnetic field position transducers may be incorporated into a conventional programmable robotic computer system. In particular, analog outputs of eight position transducers, after AZC and AGC adjustment are input into analog multiplexer units, which in turn output to analog-to-digital conversion units. The digitized output is then stored in data buffer storage units. As shown in FIG. 8, a conventional computer central processing unit may be utilized to retrieve and process output signals and data from the invented position transducers. Alternatively, the output signals and data from the invented position transducers can be retrieved and processed by a remote computer via conventional RS 232 coupling components. In either case, each of the invented magnetic field transducers will yield data regarding the position of a button 11 in a plane perpendicular to the axis of symmetry of a probe 12. Such data can then be used to reposition a movable component of a processing system without reference to its prior 'training' history. And, after repositioning, data from the invented position transducer acquired prior, during and subsequent to such repositioning is available as a further resource.

For example, the invented magnetic field position transducer offers a user of a robotic arm processing system absolute arm position feedback accurate to ±0.003 inches in any environment on a real time basis. The invented magnetic field position transducer requires no wiring to the robotic arm, a distinct advantage for vacuum processing applications. With a multiple transducer system of the type illustrated in FIG. 8, a single inert, non-powered button can be permanently affixed to the robot arm or end effector and one or more sensing probes located at pre-determined coordinate positions within the system. Output from the probe, with appropriate processing, can be recognized as valid and invalid data output as the robot arm with button attached approaches a "valid data" range as the pole face of the button moves into axial registry with axis of symmetry of the probe. [See FIGS. 10e & 10f and the output curves shown in FIG. 9.] When the robot arm is at a final command position, the probe senses the proximity of the "button". If the central pole face of the button is coaxial with the center of the probe $V_x$ and $V_y$ will be 0.000. If the central pole face of the button is not coaxial with the center of the probe then $V_x$ and $V_y$ outputs give the true location of the center of the button in ±X and ±Y to an accuracy of ±0.003 inches This data is available to the host computer.

The invented magnetic field position transducers are also useful for initially teaching and calibrating such robotic arm processing systems. In particular when the robot arm is installed and powered up, it typically goes to a "home" position. Using two invented magnetic field position transducers, the teach mode can be used to move the "button" to a first probe (at a known coordinate). The actual position of the arm can then be compared to the robot encoder count relative to an X and Y axis. After this same task is completed on a second probe position, the robot coordinate system can be aligned with the actual physical locations of the other required processing positions within the module. Such other processing positions can now be programmed using encoder counts without having to move the the arm to those respective positions.

In fact, a system of the invented magnetic field position transducers enables a host computer to monitor the location of a robotic arm in relation to the actual physical coordinates required to reliably move wafers, substrates or other items in and out of different processing positions within a closed module. Such a system also enables the user to monitor "drifting" of the robot from the taught coordinates. And, in the event of a system failure (most robot encoders go to 0000 when power is lost and then restored) the user has the advantage of knowing where the robotic arm is located without opening the processing module. This can be a tremendous advantage in the transition back to normal operation.

There are many modifications and variations that can be made to the invented position transducer system which, while not exactly described herein, fall within the spirit and the scope of invention. The magnetic field source may originate from an electrical current conducted through a wire coil. In addition the magnetic field source may be located elsewhere than in the button element. Such magnetic field source, however generated and wherever located, should provide a magnetic field with an axis of symmetry that will coincide with a measurement axis of symmetry when probe element and the button element are coaxially oriented. For example, the magnetic field source could be a permanent ring magnet located in the annular member 32. The movable button 11 could be composed of a magnetically susceptible material for providing preferential magnetic field paths from the annular sensing surface to the face plates 23 of the central quadratures 22. In this case, the magnetic field axis of symmetry and sensor axis of symmetry coincide forming a measurement axis of symmetry, while the movable button 11 provides an axis of symmetry for shaping magnetic field paths which defines the preferential magnetic field paths through the transducer system when probe and button elements are proximate in a valid data range.

Also it should be recognized that the quadratures 22 with the slits 25 dividing the quarter circle face plates 23 forming the circular sensing surface 26 of the described transducer functionally divide magnetic flux intercepted by the circular sensing surface of the probe and provide a plurality of separate, preferential magnetic field return paths each though a particular flux sensor for generating an electrical output indicative of the magnitude of magnetic flux intercepted by a particular face plate. Such functionality can be accomplished by other configurations of magnetically susceptible materials in the movable button element and the probe. For example, the movable button element could be divided into a plurality of separate congruent members symmetrically arranged about an axis of symmetry to define a central face and a surrounding annular face. In such an embodiment, the probe would include: (i) a segmented annular member composed of a magnetically susceptible materials, each providing a separate preferential magnetic field path from an annular face segment through a particular flux sensor for generating an electrical output indicative of the magnitude of magnetic flux intercepted by a central face section of a particular member of the button; and (ii) a unitary central member composed of a magnetically susceptible material for presenting a circular face co-planer and coaxial with the annular face segments. In this suggested embodiment, the magnetic field source could be generated by a current coil wound around the unitary central member. This latter suggested embodiment would have utility in environments where variations of magnetic field are not desirable.

Also, the number of the separate sensing surfaces, each with a related preferential magnetic field path through a particular flux sensor, can be varied, so long as an algorithm or mathematical function exists by which a generated signal indicative of the magnitude magnetic flux intercepted by a particular sensing surface can be correlated to the signals simultaneously generated by the remaining flux sensors. In fact, so long as an algorithm or mathematical function exists (or can be derived) for correlating the respective signals indicative of magnetic flux intercepted by a particular separate planer sensing surfaces, to those indicative of the magnetic flux simultaneously intercepted by the other remaining surfaces, the shapes locations and even areas of the respective sensing surfaces can be varied to provide desired variations in degrees sensitivity to relative displacement of the respective measurement and magnetic field path axes of symmetry in a mutually perpendicular plane. In this case, the respective analogue signals from the respective sensors could be digitized and input into an appropriate computer which could perform the necessary computations correlating sensor outputs to relative displacement of the respective axes of symmetry For applications where relative parallel alignment of the pole faces of the button and the sensing surfaces of the probe of an invented transducer can not be assured for a valid position determination, a second and preferably a third transducer should be incorporated into the system. The button axes of symmetry of the respective transducers should be oriented orthogonally but not intersect at a common origin. The corresponding the probe axes of symmetry of the respective transducers should have a corresponding orthogonal relationship. With such orthogonally related position transducers, the degree of tilt between the respective pole faces and sensing surfaces of one position transducer should show up as a valid relative position measurement on one of the other position transducers upon the relatively moving components involved in the application achieving rough alignment.

Finally, it is well within the spirit and scope of the present invention for the sensor or probe to be the movable element and the button to be the stationary element of the system. Indeed, both the sensor probe and the button may be moveable independently relative to each other. In particular, the invented position transducer indicates relative displacement of the respective measurement and magnetic field path axes of symmetry from a point of registry in a plane perpendicular to the respective axes, as well as proximity of the respective elements. (The proximity determination can be obtained by looking at a total signal indicative of magnitude and even the polarity of magnetic flux intercepted by all of the sensors surfaces.[See U.S. Pat. No. 4,691,185, Loubier et al at Col 7 lines 26–46])

A typical application for a position transducers system having movable probes and stationary buttons would be an application which includes a self contained, module capable of independent movement between a plurality of different stations not related in space. In this case the independent module would carry one or more probes of the invented position transducer, and each station would have a plurality of stationary buttons. After, locating a station, the moveable module would use the position transducers system to remotely orient and position itself and its components relative to the particular station.

The invented magnetic field position transducer has been described in context of suggested, representative, alternative and preferred embodiments. Modifications and variations can be made to the invented magnetic field position transducer while not exactly described herein, fall within the spirit and the scope of invention as described and set forth in the appended claims.

We claim:

1. A magnetic field position transducer system for measuring proximity of a first independently movable element within a valid data range of, and relative to a second independently movable element in two or more dimensions comprising, in combination,
   a) a magnetic button secured to the first movable element having means for providing a magnetic field having a single magnetic field axis of symmetry,
   b) a probe secured to the second movable element providing a symmetrical distribution of magnetically susceptible material around a measurement axis of symmetry, coupling to a plurality of separate preferential magnetic field paths,
   c) a means sensing magnetic flux density in each separate preferential magnetic field path for generating an electrical signal proportional to the magnetic flux density sensed in the particular preferential magnetic field path, and
   d) means for comparing the electrical signals generated, wherein the magnetic button and the probe secured to the respective movable elements are respectively oriented on opposite sides of a common plane such that the magnetic field and the measurement axes of symmetry are aligned perpendicularly with respect to the common plane, whereby, proximity of the first movable element within a valid data range of, and relative to the second movable element can be determined in at least two dimensions from the comparison of the electrical signals generated.

2. A magnetic field position transducer system for measuring proximity of a first independently movable element within a valid data range of, and relative to a second independently movable element in at least two dimensions comprising, in combination,
   a) a magnetically susceptible button secured to the first independently movable element for preferentially shaping a magnetic field about a button axis of symmetry,
   b) a probe secured to the second independently movable element providing a symmetrical distribution of magnetically susceptible material around a probe axis of symmetry, coupling to a plurality of separate preferential magnetic field paths, and having means for providing a magnetic field having a single axis of symmetry coinciding with the probe axis of symmetry and
   c) a means sensing magnetic flux density in each separate preferential magnetic field path for generating an electrical signal proportional to the magnetic flux density sensed in the particular preferential magnetic field path, and
   d) means for comparing the electrical signals generated, wherein the magnetically susceptible button and the probe secured to the respective movable elements are respectively oriented on opposite sides of a common plane such that the button and the probe axes of symmetry are aligned perpendicularly with respect to the common plane, whereby, proximity of the first movable element within a valid data range of, and relative to the second movable element can be determined in at least two dimensions from the comparison of the electrical signals generated.

3. The position transducer system of claim 1 or 2 wherein the probe and the button each have a planer surface perpendicular to the respective axes of symmetry whereby the relative proximity of the respective planer surfaces of the probe and the button can be determined from the electrical signals generated by the respective means sensing magnetic flux.

4. The position transducer system of claim 2 wherein the probe comprises, in combination
   e) a plurality of separate central elements composed of a magnetically susceptible material each having:
      (i) a planer face plate, and
      (ii) a magnetic flux concentrating section depending from the face plate to an inside sensor gap surface at its distal end for concentrating magnetic flux intercepted by the planer face plate at the inside sensor gap surface,
      the central elements being symmetrically positioned about the probe axis of symmetry to define a central sensing surface of a radius (c) having symmetry about the probe axis of symmetry, the central sensing surface having narrow slits separating the respective face plates; and
   f) an annular element composed of a magnetically susceptible material coaxially surrounding the central elements having:
      (iii) an annular sensing surface coplanar and coaxial with the central sensing surface, and
      (iv) a plurality of magnetic flux concentrating sections each tapering down from an annular segment of the annular sensing surface to an outside sensor gap surface at its distal end proximate a particular inside sensor gap surface for concentrating magnetic flux intercepted by the associated regular annular segment of the annular sensing surface at the outside sensor gap surface, each respective pair of inside and outside sensor gap surfaces defining a sensor gap, and g) wherein the means sensing magnetic flux in each separate preferential magnetic field path for generating an electrical signal proportional to the magnetic flux sensed comprises a plurality magnetic flux sensors taken from a class consisting of Hall effect, magneto-resistive and magneto-transistor devices, where each magnetic flux sensor is positioned in a sensor gap.

5. The position transducer system of claim 4 wherein the button comprises a plate having an axis of symmetry defining the button axis, the button further including (v) a tapering central pole piece coaxial with the button axis depending from the plate presenting a central planer pole face of a diameter (b), and (vi) an annular rim depending from the circumference of the plate presenting an annular planer pole face coplanar and coaxial with central pole face, the annular pole face having a diameter comparable to that of the annular sensing surface of the probe greater than that of the central sensing surface of the probe.

6. The position transducer system of claim 5 wherein the annular pole face presented by the button and the annular sensing surface of the probe have approximately equal mean diameter dimensions.

7. The position transducer system of claim 6 wherein a gap distance (d) measured from exterior edges of the central sensing surface to interior edges of the annular sensing surface of the probe is less than the radius (c) of the central sensing surface and greater than the diameter (b) of the central pole face of the button element.

8. The position transducer system of claim 7 wherein the gap distance (d) is selected for generating electrical signals indicative of relative proximity of the respective pole faces of the button to the respective sensing faces of the probe within a desired range, establishing a reluctance of sufficient magnitude for minimizing leakage of magnetic flux from the separate preferential magnetic field paths through the probe, and across to the respective annular pole face and central planer pole face of the button when the respective pole faces and sensing faces are proximate within the desired range.

9. The position transducer system of claim 8 wherein the means for providing a magnetic field having a single magnetic field axis of symmetry is an annular magnetic element composed of a permanently magnetized material for providing a magnetic field having axial symmetry about a central axis, and is incorporated into the annular element of the probe between its annular sensing surface and the plurality of magnetic flux concentrating sections tapering down from the annular segments of the annular sensing surface to the respective outside gap surfaces.

10. The position transducer system of claim 8 wherein the means for providing a magnetic field having a single magnetic field axis of symmetry is a permanent magnetic rod providing a magnetic field having symmetry about its longitudinal axis, the magnetic rod being incorporated into forming a part of each of the respective magnetic flux concentrating sections depending from the face plates of the probe between the face plate and the sensor gaps such that the magnetic field axis of symmetry and the probe axis of symmetry coincide, whereby, magnetic flux emanating from the respective face plates of the probe has a polarity opposite to that of magnetic flux emanating across the respective sensor gap surfaces.

11. The position transducer system of claim 1 wherein the means for providing a magnetic field having a single magnetic field axis of symmetry is a permanent magnetic rod providing a magnetic field having symmetry about its longitudinal axis, the magnetic rod being incorporated into the button between:

(i) a conical pole piece composed of a magnetically susceptible material oriented coaxially with the longitudinal axis of the rod tapering from an end face of the magnetic rod to a central planer pole face of a diameter (b), for concentrating magnetic flux emanating from that end face of the magnetic rod at the central planer pole face, and (ii) an axially symmetric plate composed of a magnetically susceptible material having an annular, depending rim for presenting a planer, annular pole face oriented coaxially with the longitudinal axis of the rod at the other end face of the magnetic rod, the annular pole face being coplaner coplanar with the central pole face, such that the single magnetic field axis of symmetry and the button axis coincide, whereby, magnetic flux emanating from the central pole face of the button has a polarity opposite to that of magnetic flux emanating from the annular pole face of the button.

12. The position transducer system of claim 11 wherein the probe comprises, in combination e) a plurality of separate central elements composed of a magnetically susceptible material each having:

(iii) a planer face plate, and (iv) a magnetic flux concentrating section depending from the face plate to an inside sensor gap surface at its distal end for concentrating magnetic flux intercepted by the planer face plate at the inside sensor gap surface, the central elements being symmetrically positioned and oriented to define a probe axis of symmetry and a central sensing surface of a radius (c) having symmetry about the probe axis of symmetry, the central sensing surface having narrow slits separating the respective face plates; and f) an annular element composed of a magnetically susceptible material coaxially surrounding the central elements, the annular element having:

(vi) an annular sensing surface coplanar and coaxial with the central sensing surface, and (vii) a plurality of magnetic flux concentrating sections each tapering down from an annular segment of the annular sensing surface to an outside sensor gap surface at its distal end proximate a particular inside sensor gap surface for concentrating magnetic flux intercepted by the associated regular annular segment of the annular sensing surface at the outside sensor gap surface, each respective pair of inside and outside sensor gap surfaces defining a sensor gap, and g) wherein the means sensing magnetic flux in each separate magnetic field path for generating an electrical signal proportional to the magnetic flux sensed in the particular magnetic field path comprises a plurality magnetic flux sensors taken from a class consisting of Hall effect, magneto-resistive and magneto-transistor devices, where each magnetic flux sensor is positioned in a sensor gap.

13. The position transducer system of claim 12 wherein the annular pole face presented by the button and the annular sensing face of the probe have approximately equal mean diameter dimensions.

14. The position transducer system of claim 13 wherein a gap distance (d) measured from exterior edges of the central sensing surface to interior edges of the annular sensing surface of the probe is less than the radius (c) of the central sensing surface and greater than the diameter (b) of the central pole face of the button element.

15. The position transducer system of claim 14 wherein the gap distance (d) is selected for generating electrical signals indicative of relative proximity of the respective pole faces of the button to the respective sensing faces of the probe within a desired range, establishing a reluctance of sufficient magnitude for minimizing leakage of magnetic flux from the separate preferential magnetic field paths through the probe, and across to the respective annular pole face and central planer pole face of the button when the respective pole faces and sensing faces are proximate within the desired range.

16. The position transducer system of claim 3 wherein the means for comparing the electrical signals generated comprises, in combination, e) summing operational amplifier means, $\Sigma X$, $\Sigma Y$ & $\Sigma REF$, each connected for receiving, algebraically summing and amplifying the electrical signals from the means sensing magnetic flux, and generating at least three output electrical signals, f) a separate automatic zero correction (AZC) circuitry means connected for receiving the output electrical signals from each of summing operational amplifier means $\Sigma X$ & $\Sigma Y$ for establishing a zero reference electrical value and adjusting the respective output electrical signals with respect to the zero reference electrical value, and g) an automatic gain correction (AGC) circuitry means connected for receiving the adjusted output electrical signals from each separate automatic zero correction (AZC) circuitry means for adjusting the magnitude of the respective adjusted output electrical signals originating from summing operational amplifier means $\Sigma X$ & $\Sigma Y$, and h) position indicating means connected for receiving the AZC and AGC adjusted electrical signal outputs from the respective summing operational amplifiers $\Sigma X$ & $\Sigma Y$ and the electrical signal output from the summing operational amplifier means $\Sigma REF$ for indicating a position of the single magnetic field axis of symmetry relative to the measurement axis of symmetry in a plane mutually perpendicular to the respective axes when the button and the probe are moving relative to each other within a valid data range.

17. The position transducer system of claim 16 where in the position indicating means further includes means for determining and indicating the relative spacing between the respective planer surfaces of the button and the probe when the button and the probe are moving relative to each other within a valid data range.

18. The position transducer system of claim 16 wherein the respective summing operational amplifiers $\Sigma X$ & $\Sigma Y$ algebraically sum the electrical signals from the respective means sensing magnetic flux according to the flowing relationships:

$$V_x = [(v_a + v_b) - (v_c + v_d)];$$
$$V_y = [(v_a + v_d) - (v_b + v_c)];$$

where:

$V_x$ is a voltage indicative of position along a reference x-axis in the plane mutually perpendicular to the respective axes of symmetry, $V_y$ is a voltage indicative of position along a reference y-axis perpendicular to the x-axis in the mutually perpendicular plane, $v_a$ is a voltage output of a magnetic flux sensor sensing magnetic flux in preferential magnetic field path a, $v_b$ is a voltage output of a magnetic flux sensor sensing magnetic flux in preferential magnetic field path b, $v_c$ is a voltage output of a magnetic flux sensor sensing magnetic flux in preferential magnetic field path c, and $v_d$ is a voltage output of a magnetic flux sensor sensing magnetic flux in preferential magnetic field path d.

19. The position transducer system of claim 18 and further including:

k) an analog multiplexer means connected for receiving the AZC and AGC adjusted the electrical signal outputs from the respective summing operational amplifier means $\Sigma X$ & $\Sigma Y$ and the electrical signal output from the summing operational amplifier means $\Sigma REF$ for multiplexing such signals providing multiplexed electrical output signals;

l) an analog-to-digital conversion means connected for receiving the multiplexed electrical output signals for generating digitized electrical signal trains correlating to the respective adjusted and electrical signal outputs from the summing operational amplifier means $\Sigma X$ & $\Sigma Y$ and $\Sigma REF$;

m) a data storage buffer means connected for receiving for receiving the digitized electrical signal trains correlating to the respective adjusted and electrical signal outputs from the summing operational amplifiers $\Sigma X$ & $\Sigma Y$ and $\Sigma REF$ for separately storing the respective digitized signal trains;

n) a programmable computer data processing means for retrieving, processing and appropriately displaying the respective digitized signal trains, the programmable computer data processing means being connected for controlling and operating the analog multiplexer means, the analog-to-digital conversion means, the data buffer storage buffer means, whereby, the summing operational amplifiers means $\Sigma X$ & $\Sigma Y$ and $\Sigma REF$, the respective automatic zero correction (AZC) circuitry means and the respective automatic gain correction (AGC) circuitry means can be controlled and adjusted via the programmable computer data processing means.

20. The position transducer system of claim 19 further including at least a second identical position transducer system including:

a second probe and a second button each with the respective single magnetic field and measurement axis of symmetry;

a second set of summing operational amplifier means, $\Sigma X$, $\Sigma Y$ & $\Sigma REF$, each connected for receiving, algebraically summing and amplifying the electrical signals from the means sensing magnetic flux of the second position transducer system, and generating a second set of at least three output electrical signals;

a second set of separate automatic zero correction (AZC) circuitry means connected for receiving the output electrical signals from each of the second set of summing operational amplifier means ΣX & ΣY for establishing a zero reference electrical value and adjusting the respective output electrical signals with respect to the zero reference electrical value;

a second set of automatic gain correction (AGC) circuitry means connected for receiving the adjusted output electrical signals from each separate automatic zero correction (AZC) circuitry means for adjusting the magnitude of the respective adjusted output electrical signals originating from the second set of summing operational amplifier means ΣX & ΣY;

the position indicating means being connected for allowing the programmable computer data processing means to retrieve, process and display respective digitized signal trains originating with the second position transducer system, the programmable computer data processing means also being connected for controlling the summing operational amplifiers means ΣX & ΣY and ΣREF, the respective automatic zero correction (AZC) circuitry means and the respective automatic gain correction (AGC) circuitry means of the second position transducer system.

\* \* \* \* \*